Jan. 15, 1963  W. J. LOFSTEDT  3,073,363
DOUBLE SPINDLE LATHE
Filed March 7, 1961

INVENTOR.
William J. Lofstedt
BY
Ramsey and Kolisch
Attys.

United States Patent Office 3,073,363
Patented Jan. 15, 1963

3,073,363
DOUBLE SPINDLE LATHE
William J. Lofstedt, Portland, Oreg., assignor to Premier Gear & Machine Works, Inc., Portland, Oreg., a corporation of Oregon
Filed Mar. 7, 1961, Ser. No. 93,997
10 Claims. (Cl. 144—209)

This invention relates to veneer lathes, and more particularly to an improved spindle construction for the chuck mechanism in a lathe, and the mounting for the spindle construction.

The usual veneer lathe has a pair of oppositely disposed and spaced-apart chuck mechanisms, with centers in axial alignment, mounted on spaced-apart lathe pedestals. The chuck mechanisms are advanced toward each other into the ends of a log to hold a log, and on turning of the chuck mechanism the log is rotated with veneer being cut therefrom. A chuck with a relatively large diameter can grip or hold the end of a log better than one with a small diameter. The disadvantages of relying entirely upon the use of a large chuck, however, is that it makes impossible the cutting of logs down to a small core. This is so since the knife at its ends overlaps the chuck mechanisms, so that the chuck mechanisms are in the way of the knife as it moves inwardly on a log. To enable the cutting of more veneer from a core (thus to obtain better use of the log) chuck mechanisms have been developed comprising two chucks, a relatively large outer chuck and a smaller inner chuck concentric therewith. With such a chuck mechanism, the outer chuck is used during the initial cutting of veneer (either alone or with the other), and this is retracted and the inner chuck used during the final cutting of veneer. A double chuck mechanism requires double spindles, one for each chuck, and these are relatively axially movable to accommodate relative axial shifting of the chuck attached thereto.

A general object of this invention is to provide an improved construction for such double spindles, and improved power-operated means for producing relative axial movement of the spindles, that is relatively trouble-free in operation, and that in other respects has generally superior performance characteristics.

The spindles of a veneer lathe are ordinarily quite long, and as already indicated, power-operated mechanism is required to produce relative axial movement of the spindles. The necessity for such power-operated mechanism, and the considerable length of the usual spindles, has resulted in constructions where typically there is a considerable projection of rotating operating parts from the stationary lathe pedestal. This projection of rotating operating parts has resulted, in some constructions, in the occurrence of gyrating tendencies which if excessive are disadvantageous because of the wear they cause in the parts. Another object of this invention, therefore, is to provide a double spindle construction for a lathe, including power-operated means for producing relative axial movement of the spindles, that can be made in a relatively compact form, without excessive projection from a lathe pedestal of rotating operating parts, whereby gyrating tendencies may be minimized.

A somewhat related object is to provide a construction for the double spindles in a lathe, where the spindles and means for axially shifting them are so related that the parts are effective to interbrace themselves, producing a rigidity minimizing gyrating tendencies.

Another object is to provide an improved double spindle construction, where relative axial shifting of the spindles is produced by actuating double-acting fluid rams or jacks, such being disposed parallel to each other and having one set of ends that are mounted on a common support member that itself is journaled on a lathe pedestal, the other set of ends of the jacks being connected to and supported by the spindles.

It is another object of the invention to provide a construction where the jacks or rams that are used to produce relative axial shifting of the spindles comprise cylinder portions integral with the spindles and axially shiftable therewith, and rod portions carried by a support that is rotatable with the spindles but constrained from axial movement. The construction enables fluid passages to be provided in the rod portions for the supply and exhaust of pressure fluid to and from opposite ends of the cylinders, with the elimination of any need for conduits for this purpose supported externally of the cylinders.

Still another object of the invention is to provide a double spindle construction employing a rotatable and axially fixed support for the ends of rams or jacks, that includes a relatively rotatable fluid distributing means for the supply of pressure fluid to the rams, such means being held stationary during rotation of the support by means that anchors it and includes a lost-motion construction accommodating any gyrations that may be present.

A still further object is to provide an improved double spindle construction where there is uniformity in the parts used, and removal and replacement of parts is relatively simple.

These and other objects and advantages are attained by the invention, and the same is described hereinbelow in conjunction with the accompanying drawings, wherein.

Figure 1:
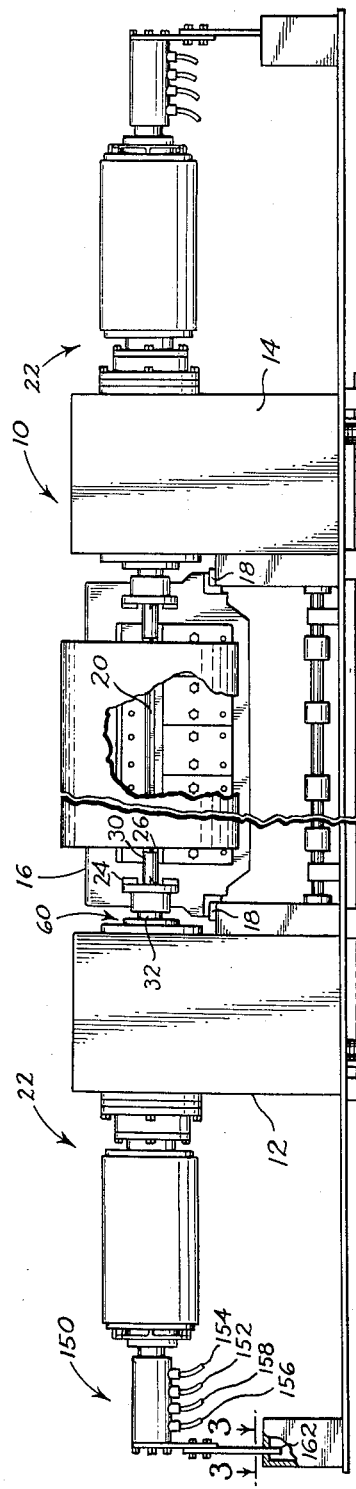
FIG. 1 is an elevation viewing, front portions of a lathe, and illustrating opposed lathe pedestals, each mounting an extensible-retractable double chuck mechanism, with double spindles as contemplated by this invention.

Referring now to the drawings, and first of all more particularly to FIG. 1, 10 indicates a lathe generally. Lathe 10 has opposed upstanding pedestals 12, 14. Between the pedestals is a carriage 16, shiftable to and fro between the pedestals on ways 18. Carriage 16 supports the usual cutting knife 20.

Figure 2:
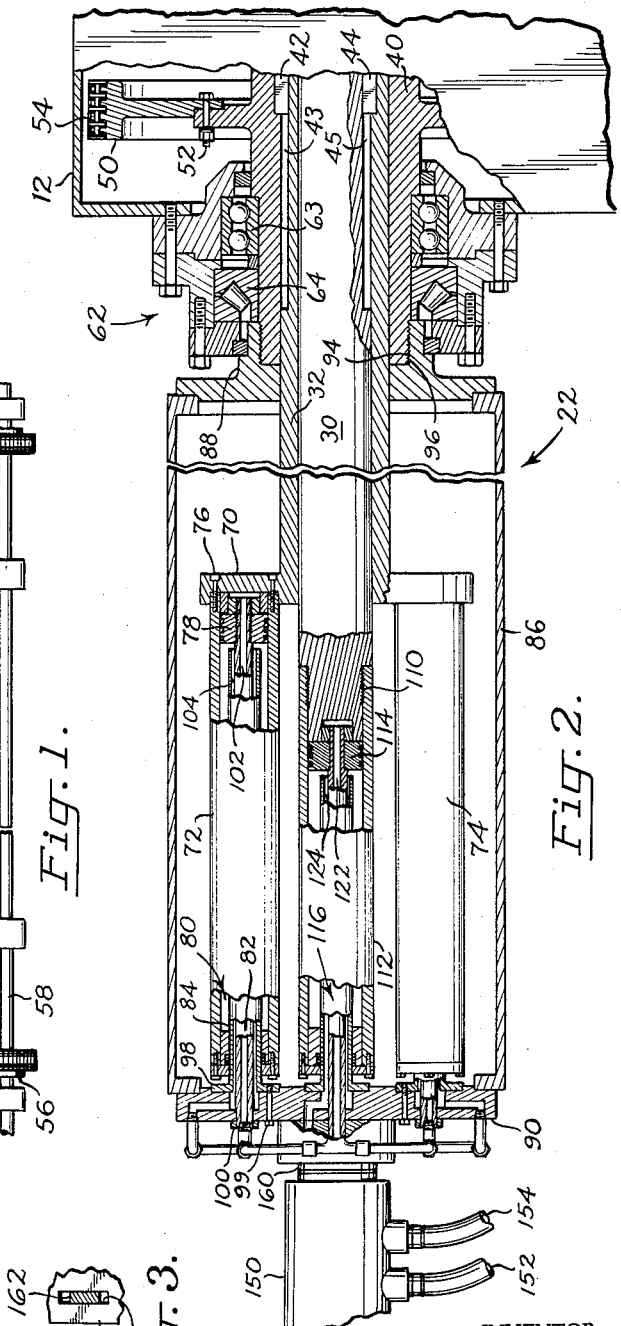
FIG. 2 is a view, in a slightly enlarged scale and with portions broken away, of part of the double spindle construction contemplated, illustrating a set of ends of the spindles and rams or jacks for producing relative axial movement thereof.

Each pedestal 12, 14 mounts a double spindle construction, indicated in FIGS. 1 and 2 generally at 22. The two double spindle constructions are axially aligned, and mounted on the inner end of each are a pair of concentric chucks 24, 26, which together comprise a double chuck mechanism in the lathe. Chucks 24, 26 of the two spindle constructions are in axial alignment (have centers aligned), and when opposed chuck mechanisms are brought toward each other, they dig into opposite ends of a log thus to hold it as veneer is cut therefrom. The knife has ends overlapping the chuck mechanisms when they are in a position holding the ends of a log. Inner chuck 26 of each double chuck mechanism is smaller than outer chuck 24, and thus when chucks 24 are retracted to leave only the inner chucks holding the end of a log (the position of the chucks shown in FIG. 1), knife 20 may be shifted inwardly toward the centers of the chuck mechanisms farther than possible without such retraction of the outer chucks, permitting the cutting of a log to a core of smaller diameter.

Considering now details of a double spindle construction 22, and with reference now to both FIGS. 1 and 2, each comprises an elongated inner spindle 30 (the left end of such spindle being illustrated in FIG. 2) which is connected to and mounts the smaller chuck 26. Paralleling the inner spindle, and with the inner spindle inside it, is a tubular outer spindle 32. The outer spindle is connected to and mounts the larger outer chuck 24.

Within the framework of a pedestal (pedestal 12 when considering the left double spindle construction in FIG. 1), and surrounding the inner and outer spindles, is an elongated sleeve or quill 40. Outer spindle 32 is slidable axially within the quill, and secured to the quill for rotation therewith. Thus, an elongated key 42 projects radially inwardly from the inside of quill 40, and this is received within a keyway 43 formed in the outside of spindle 32. The inner spindle 30 is slidable axially of outer spindle 32 and keyed to the outer spindle so as to rotate therewith. Thus, key 44 projects inwardly from the inside of spindle 32, and this is received within keyway 45 provided in the inner spindle.

Rotatably mounting the end of quill 40 adjacent the ends of the spindles mounting chucks 24, 26 is a bearing assembly 60 (see FIG. 1). Rotatably mounting the opposite end of the quill is a bearing assembly 62, comprising radial bearing 63 and thrust bearing 64 (see FIG. 2). Bearing assemblies 60, 62 and the quill constitute means journaling the spindles on the pedestal, with the outer spindle slidable axially on the pedestal.

At 50 there is indicated a driving gear encircling quill 40 and secured thereto as by nut and bolt assemblies 52. Trained over the driving gear is a chain 54. The bottom of chain 54 is trained over a sprocket 56 at the base of the pedestal, such being secured to a drive shaft 58. The drive shaft, chain and driving gear constitute power-operated means for rotating the quill and in turn rotating the spindles.

Considering now the power-operated means provided for shifting the various spindles relatively to each other in an axial direction, it will be seen, with reference to FIG. 2, that the hollow outer spindle 32 stops short of the inner spindle, at the left set of the ends of the spindles in the figure, and is provided with an annular flange 70 projecting radially out therefrom. Flange 70 constitutes a mounting portion or means in the construction for mounting in fixed position the closed ends of a pair of parallel cylinders, indicated at 72, 74. These cylinders parallel the spindles, and are secured to the flange as by screws 76. Mounted for reciprocation to and fro within the cylinders are pistons such as pistons 78. Each piston 78 is secured to a rod assembly or means 80, comprising a hollow core 82 and surrounding it a tube 84. The cylinders, pistons and rod assemblies described form the double-acting rams or jacks for producing axial movement of outer spindle 32.

According to this invention, the rams or jacks producing axial shifting of the spindles are supported at one set of ends on a support that is journaled on the pedestal. Such support, in the embodiment illustrated, takes the form of a hollow cylindrical housing portion 86 surrounding the jacks, and a mounting portion 88 encircling the inner and outer spindles at a location toward the end of spindle 32 opposite the end having flange 70. Closing off the left end of cylindrical portion 86 in FIG. 2, and also part of the support, is an end wall 90.

Mounting portion 88 is joined to quill 40 (and thus journaled on the pedestal for rotation with the spindles) by screwing an internally threaded portion 94 of the mounting portion onto a threaded stem 96 of the quill. From thence the support extends out from the pedestal, but because of its cylindrical shape, its relatively short length, and the contribution of the rams within the support of making it rigid, there is little tendency for the same to whip during operation of the lathe with the production of troublesome gyrations.

Rod assembly 80 for each cylinder is secured to end wall 90 by screws 99 and flange 98 fixing tube 84 of the assembly to the end wall, and a nut 100 screwed onto a reduced and threaded end of core 82. Because of their fixed connection with the end wall, the rod assemblies are held from axial movement, but on operation of the lathe and turning of the spindles, of course, they move in circular sweeps about the center axes of the spindles.

To produce extension of a cylinder 72 or 74 from its piston and rod means, fluid under pressure is admitted to a passage 102 extending down the center of core 82, such fluid entering the interior of the cylinder on the right side of piston 78, and as a result exerting a force on the cylinder tending to produce in it axial movement to the right in FIG. 2. On movement of the cylinder (which is accompanied with shifting of the outer spindle 32 in the same direction) fluid is exhausted from the space to the left of the piston through an annular space 104 between the outside of core 82 and the inside of tube 84. Conversely, to return the cylinder, fluid under pressure is admitted into the cylinder on the left side of the piston through annular space 104, with exhaust of fluid from the right side of the piston through passage 102.

A pair of rams or jacks are provided for the outer spindle 32, one on either side of the inner spindle (so that they are equally circumferentially spaced about the axes of the spindles), since this aids in producing dynamic balance, important when it is remembered that the entire assembly is rotating during operation of the lathe. Further, by using two jacks, adequate penetration of a log end by chuck 24 connected to spindle 32 is assured (this being the larger of the two chucks).

Considering now the ram or jack provided to produce axial shifting of inner spindle 30, 112 indicates a cylinder aligned axially with the end of spindle 30 in FIG. 2. This is screwed onto a threaded portion 110 of the spindle. Within the cylinder is a piston 114, and a rod assembly or means 116. The construction of the rod means is similar to the construction of rod means 80 already described. To extend cylinder 112 to the right in FIG. 2, fluid under pressure is admitted to the cylinder through a passage 122 and fluid is exhausted through an annular passage 124. To retract the cylinder the converse is true.

At 150 there is indicated a conventional type of rotatable manifold or fluid distributing means, which is provided for supplying and exhausting fluid to and from the passages just described. Connected to the manifold are conduits 152, 154, for the supply and exhaust of fluid to and from the outer jacks formed by cylinders 72, 74. Conduits 156 and 158, that are also connected to the manifold, are for the supply and exhaust of fluid to and from the center jack formed by cylinder 112. A conventional valve (not shown) is used to control the flow of fluid in conduits 152, 154, 156, 158. The manifold is mounted on end wall 90 of the support by means enabling rotation of the manifold with respect to the end wall, since the spindle construction and end wall are rotating on operation of the lathe, and the conduits and manifold of course must remain relatively stationary. At 160 there is indicated generally means journaling the manifold on end wall 90.

Figure 3:
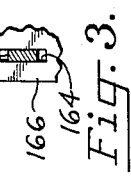
FIGURE 3 is a sectional view illustrating the lost motion means and is taken along line 3, 3 of FIGURE 1.

Anchoring an end of the rotary manifold is a depending toggle arm 162 (see FIGS. 1 and 3). The toggle arm has its lower end received within a slot 164 provided a stationary plate 166. As can be seen with reference to FIG. 3, slot 164 has a length, in a direction extending transversely of the spindle axes, that is somewhat greater than the dimension of the arm in this direction (its width), and therefore in this same direction limited freedom of movement of the arm with respect to the plate may take place. The slot also accommodates some up and down movement of the arm. Side-to-side movement, however, is constrained by the the slot, which is substantially as wide as the arm is thick. The slot constitutes a lost motion means in the anchoring mechanism for the manifold, which is included to take care of any gyrations that may be present.

In conclusion, it will be seen that there has been provided a relatively simple and easily repaired construction for double spindles, and the means provided for axially shifting the spindles. The projection of rotating operating parts from the lathe pedestal is reduced to a minimum. Those parts that do project have such rigidity that gyrational tendencies are taken care of. The rams employed are easy to repair and service. There are no complex sealing surfaces such as might introduce leakage problems, and there is a uniformity in the parts that reduces construction costs.

I claim:

1. In a veneer lathe having a pedestal, elongated inner and outer spindles disposed with the inner spindle inside and paralleling the outer spindle and axially slidable therein, means journaling said spindles on said pedestal with the outer spindle slidable axially on the pedestal, mounting means joined to and projecting radially out from one end of said outer spindle at one set of ends of the spindles, a support including a portion encircling the outer spindle toward the end thereof opposite its one end, said portion of said support being journaled on the pedestal, said support having an end wall disposed axially beyond said one set of ends of the spindles, and at least a pair of rams paralleling each other for producing relative axial movement of the spindles, one of said rams being aligned axially with the inner spindle and interposed between and operatively connected to the inner spindle and said end wall, the other of said rams being interposed between and operatively connected to said end wall and said mounting means.

2. In a veneer lathe having a pedestal, elongated inner and outer spindles disposed with the inner spindle inside and paralleling the outer spindle and axially slidable therein, means journaling said spindles on said pedestal with the outer spindle slidable axially on the pedestal, mounting means joined to and projecting radially out from one end of said outer spindle at one set of ends of the spindles, a support including a portion encircling the outer spindle toward the end thereof opposite its said one end, said portion of said support being journaled on the pedestal, said support having an end wall disposed axially beyond said one set of ends of the spindles, a double-acting ram aligned axially with the inner spindle and interposed between and operatively connected to the inner spindle and said end wall, and plural double-acting rams paralleling said first-mentioned ram interposed between and operatively connected to said mounting means and said end wall, said plural rams being equally circumferentially spaced about the longitudinal axes of the spindles so as to be dynamically balanced on rotation of the spindles, said rams on extension and contraction being operable to produce relative axial movement of the inner and outer spindles.

3. In a veneer lathe having a pedestal, elongated inner and outer spindles disposed with the inner spindle inside and paralleling the outer spindle and axially slidable therein, means journaling said spindles on said pedestal with the outer spindle slidable axially on the pedestal, an elongated hollow cylindrical housing covering one set of ends of the spindles and having a mounting portion encircling the outer spindle at a location intermediate the ends of the outer spindle, said mounting portion of the housing being journaled on the pedestal, said housing having an end wall disposed axially beyond said one set of ends of the spindles, mounting means joined to and projecting radially out from the end of said outer spindle at said one set of ends of the spindles with said mounting means spaced from said end wall of the housing, plural double-acting rams paralleling the outer spindle interposed between and operatively connected to said mounting means and said end wall and equally circumferentially spaced about the axes of the spindles, and a ram interposed between and operatively connected to the end of the inner spindle at said one set of ends and said end wall, extension and contraction of said rams producing relative axial movement of said spindles.

4. A veneer lathe double-spindle construction comprising elongated inner and outer spindles disposed with the inner spindle inside and paralleling the outer spindle and axially slidable therein, a support having a wall disposed axially beyond the ends of the spindles at one set of their ends, means rotatably mounting said support and spindles, a cylinder axially aligned with and fixed to the inner spindle and extending axially from its end at said one set of ends of the spindles, a mounting portion joined to the end of the outer spindle and projecting out therefrom at said one set of ends of the spindles, a cylinder fixed to said mounting portion and paralleling the first-mentioned cylinder, a piston for each cylinder and rod means therefor extending toward said wall of the support the outer ends of said rod means being connected to said wall, and fluid passage means for the supply and exhaust of fluid under pressure to opposite ends of said cylinders, each cylinder and its piston constituting a double-acting ram means for producing axial shifting of a spindle.

5. A veneer lathe double spindle construction comprising elongated inner and outer spindles disposed with the inner spindle inside and paralleling the outer spindle and axially slidable therein, a ram connected to the end of the inner spindle at one set of ends of the spindles including a cylinder fixed to the inner spindle and rod means extending out of said cylinder, another ram paralleling the first-mentioned ram connected to the end of the outer spindle at said one set of ends including a cylinder fixed to the outer spindle and rod means extending out from the cylinder, a support with a wall disposed beyond the ends of the rams, means mounting the rod means of the rams on said support, and means journaling the support and spindles for rotation of the two as a unit.

6. A veneer lathe double spindle construction comprising elongated inner and outer spindles disposed with the inner spindle inside and paralleling the outer spindle and axially slidable therein, a ram connected to the end of the inner spindle at one set of ends of the spindles including a cylinder fixed to the spindle and rod means extending out of the cylinder, another ram paralleling the first-mentioned ram connected to the end of the outer spindle at said one set of ends including a cylinder fixed to the spindle and rod means extending out of the cylinder, a support with a wall disposed beyond the ends of the rams and means mounting the rod means of the rams on said support, said support having a mounting portion encircling the spindles intermediate the ends of the outer spindle, means journaling said mounting portion and spindles, fluid distributing means rotatable with respect to said support and mounted on the support for the supply and exhaust of fluid under pressure to said rams, and means anchoring said fluid distributing means operable to hold it from rotating on rotation of the support and spindles and including lost motion means accommodating limited freedom of movement of the fluid distributing means.

7. In a veneer lathe having a pair of concentric chucks and a pedestal for mounting the chucks, a double spindle construction for the chucks accommodating relative axial shifting of the chucks comprising elongated inner and outer spindles disposed with the inner spindle inside and paralleling the outer spindle and slidable relative to the outer spindle, said chucks being connected to the spindles at one set of their ends, a flange joined to and projecting radially out from the outer spindle at the end of the spindle opposite the chucks, a support having a mounting portion encircling the outer spindle at a location intermediate its ends, means journaling said mounting portion of said support and said one set of ends of the spindles with the outer spindle axially shiftable therein, said support having an end wall disposed axially beyond the other set of ends of the spindles, a cylinder fixed to and forming an extension of said inner spindle at the end of the spindle opposite the chucks, a piston within said cylinder and rod means connected thereto extending out from the cylinder and with its outer end fixed to said end wall, said piston and cylinder constituting fluid operated means for producing axial shifting of said inner spindle, a series of cylinders equally circumferentially spaced about and paralleling said first-mentioned cylinder fixed to said flange, and pistons within the series of cylinders and rod means connected to the pistons extending out from the cylinders and with outer ends fixed to said end wall, said last-mentioned series of cylinders and their pistons constituting fluid-operated means for producing relative axial shifting of said outer spindle.

8. The lathe of claim 7 which further comprises fluid distributing means rotatable with respect to said support and mounted on the support for the supply and exhaust of fluid under pressure to said fluid-operated means, and means anchoring said fluid distributing means operable to hold it from rotating on rotation of the support and spindles and including lost motion means accommodating limited freedom of movement of the fluid distributing means.

9. In a veneer lathe having a pedestal and a pair of concentric chucks shiftable relatively to each other in an axial direction, elongated inner and outer spindles connected at one set of their ends to the chucks, one to each chuck, the inner spindle being inside and paralleling the outer spindle and slidable in an axial direction relative to the outer spindle, a rotatable support member, said support member having a cylinder portion closed at one end by an end wall surrounding the other set of ends of the spindles with the end wall beyond the spindles and a mounting portion encircling the outer spindle intermediate its ends, means rotatably mounting said mounting portion of the support member and said one set of ends of the spindles on said pedestal with the outer spindle slidable axially therein and with said cylinder portion projecting from the pedestal, parallel rams set side by side within said cylinder portion, one of said rams being axially aligned with the inner spindle and connected at one end thereto and another of said rams being connected at one end to the outer spindle, the other ends of said rams being connected to said end wall of the support member, fluid distributing means rotatable with respect to said support member and mounted on the cylinder portion of the support member for the supply and exhaust of fluid under pressure to said rams, and means anchoring said fluid distributing means operable to hold it from rotating on rotation of the support member and spindles and including lost motion means accommodating limited freedom of movement of the fluid distributing means.

10. In a veneer lathe having a pedestal, elongated inner and outer spindles disposed with the inner spindle inside and paralleling the outer spindle and axially slidable therein, means journaling said spindles on said pedestal with the outer spindle slidable axially on the pedestal, mounting means joined to and projecting radially out from adjacent one end of one of said spindles, a support including a portion encircling the outer spindle intermediate the ends of the outer spindle, said portion of said support being journaled on the pedestal, said support having an end wall disposed axially beyond said one end of said one spindle and the adjacent end of the other spindle, and at least a pair of substantially parallel rams for producing relative axial movement of the spindles, one of said rams being interposed between and operatively connected to said end wall and said mounting means, the other of said rams being interposed between and operatively connected to said other spindle and said end wall.

References Cited in the file of this patent
UNITED STATES PATENTS 2,869,596    Latimer    Jan. 20, 1959
2,959,202    Springate    Nov. 8, 1960

FOREIGN PATENTS 1,137,010    France    Jan. 7, 1957